Nov. 26, 1935.  H. S. EBERHARD  2,022,079
MOTOR VEHICLE
Filed April 28, 1931  4 Sheets-Sheet 1
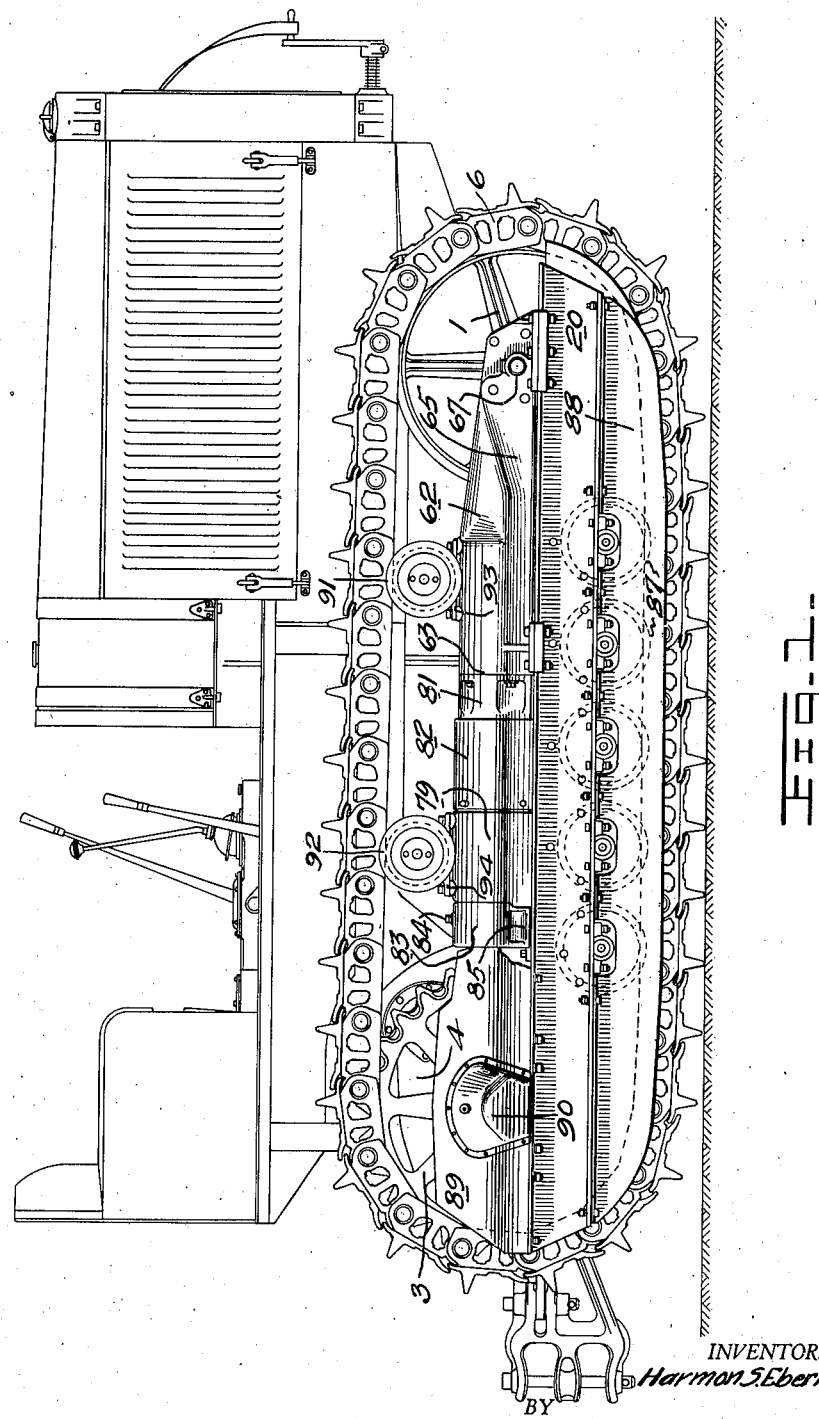
INVENTOR.
Harmon S. Eberhard
BY
ATTORNEYS.

Nov. 26, 1935. H. S. EBERHARD 2,022,079
MOTOR VEHICLE
Filed April 28, 1931  4 Sheets-Sheet 2
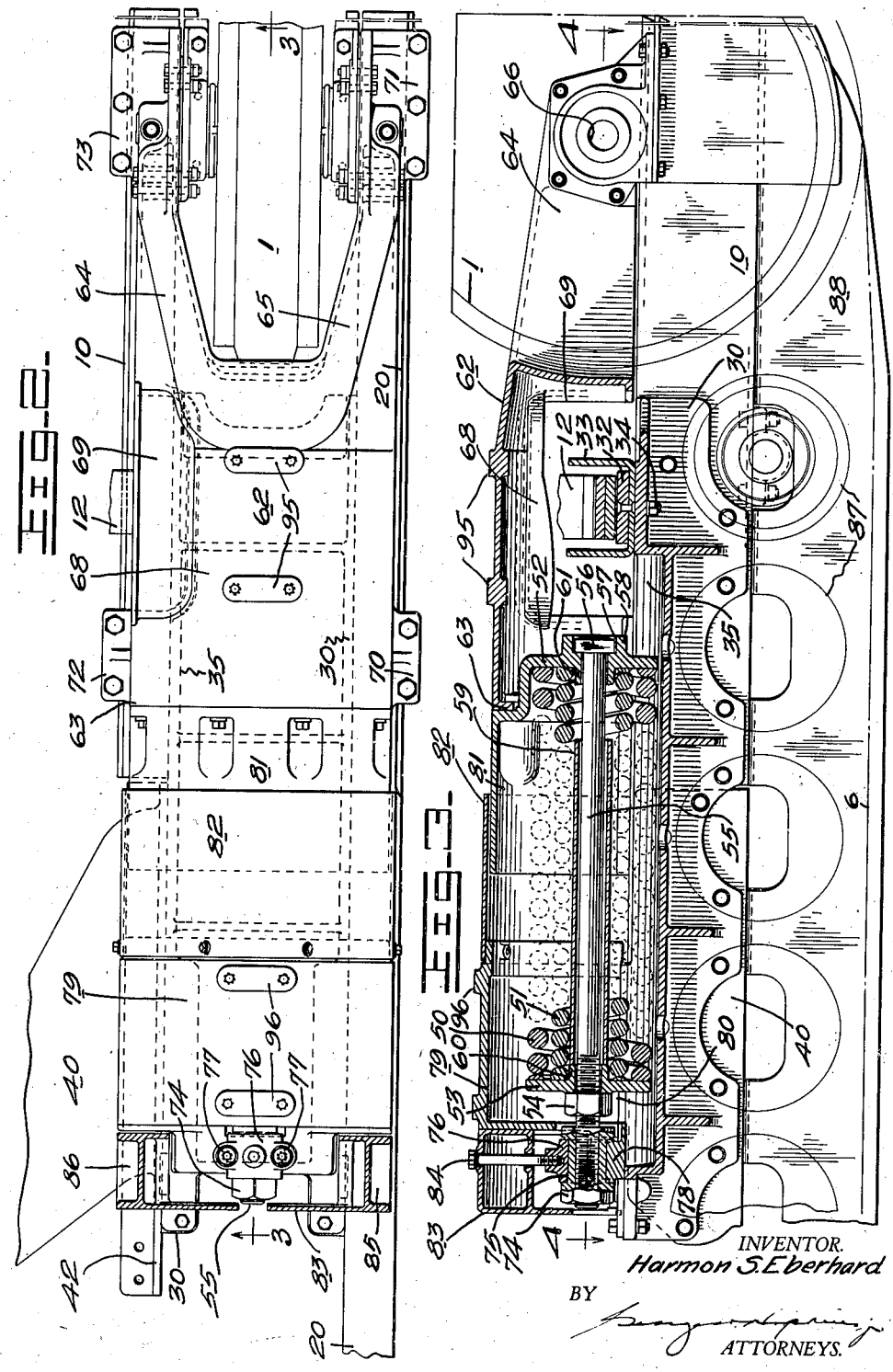
INVENTOR.
Harmon S. Eberhard
BY
ATTORNEYS.

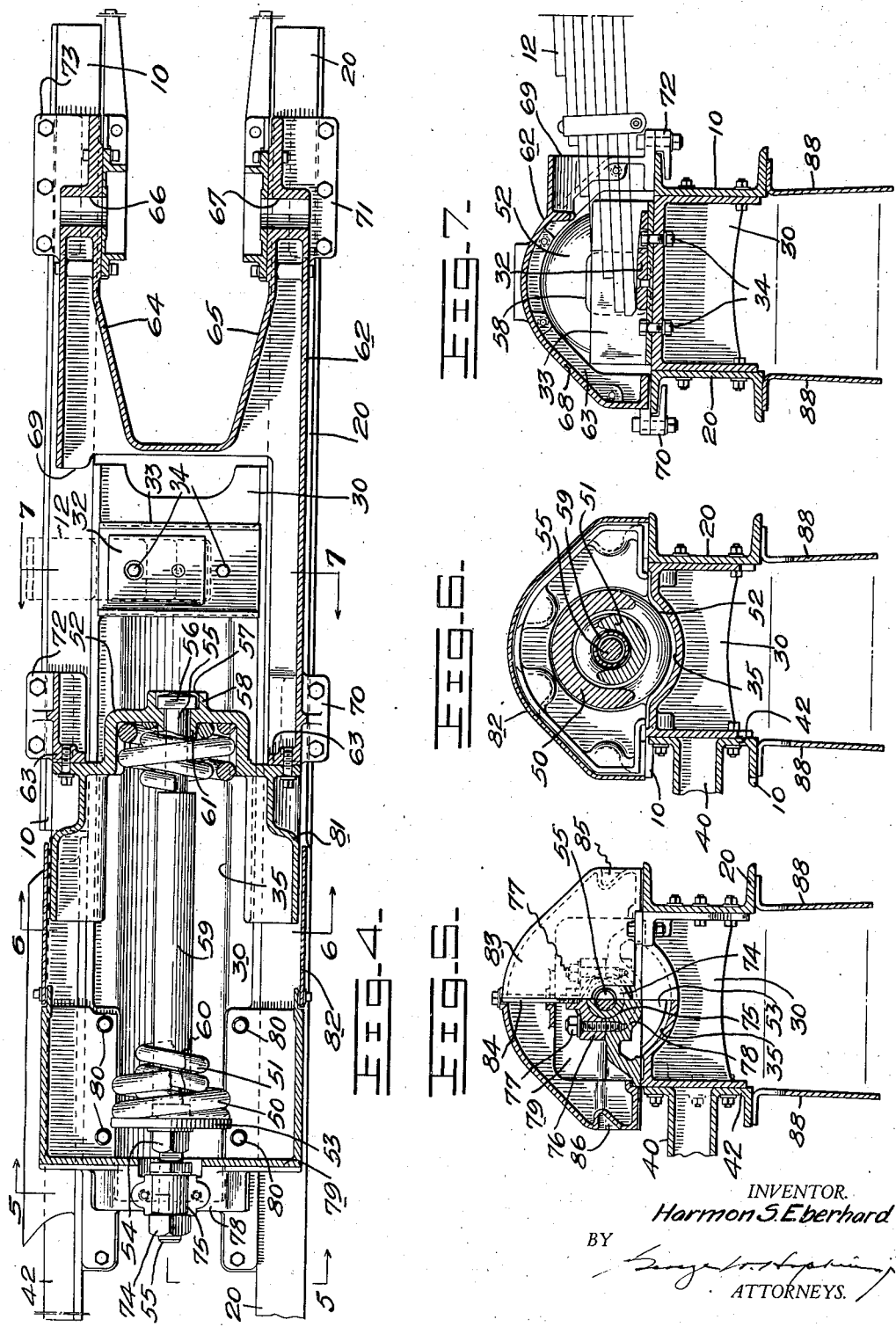

Nov. 26, 1935.  H. S. EBERHARD  2,022,079
MOTOR VEHICLE
Filed April 28, 1931  4 Sheets-Sheet 4
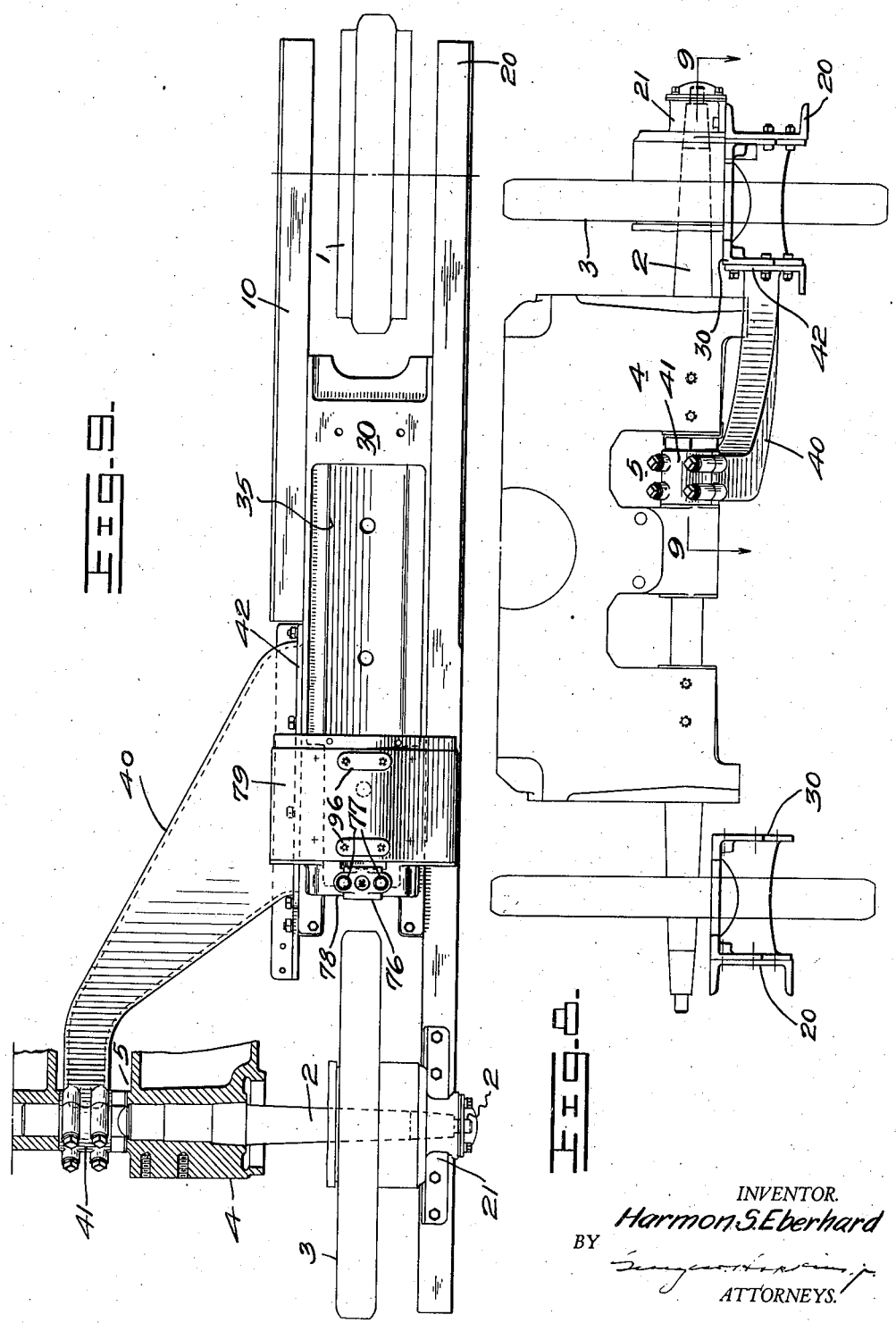
INVENTOR.
Harmon S. Eberhard
BY
ATTORNEYS.

Patented Nov. 26, 1935

2,022,079

UNITED STATES PATENT OFFICE 2,022,079

MOTOR VEHICLE

Harmon S. Eberhard, San Leandro, Calif., assignor to Caterpillar Tractor Co., San Leandro, Calif., a corporation of California Application April 28, 1931, Serial No. 533,427

43 Claims. (Cl. 305—9)

My invention relates to motor vehicles, and particularly to tractors of the track type. The objects of my invention are: first, to provide an improved track mechanism for a track-type tractor; second, to provide an improved frame for the track mechanism of a track-type tractor; third, to provide improved means for mounting the track mechanism on a track-type tractor.

Fig. 1 is a side elevation of a tractor equipped with track mechanism embodying the invention.

Fig. 2 is a plan view of the central portion of the truck frame.

Fig. 3 is a vertical longitudinal section on line 3—3 of Fig. 2.

Fig. 4 is a horizontal longitudinal section on line 4—4 of Fig. 3.

Fig. 5 is a vertical transverse section in two planes, as indicated by line 5—5 in Fig. 4.

Fig. 6 is a vertical transverse section on line 6—6 of Fig. 4.

Fig. 7 is a vertical transverse section on line 7—7 of Fig. 4.

Fig. 8 is a rear end view of the truck frame illustrating the method of mounting on the tractor.

Fig. 9 is a plan view of the truck frame with parts omitted, the inner mounting of the truck being illustrated as a section on line 9—9 of Fig. 8.

The truck frame is fabricated by securing a short inner channel bar 10 (Fig. 9) and a long outer channel bar 20 to a central member 30. Side channels 10 and 20 extend forwardly from member 30 to support an idler 1, and outer side channel 20 extends rearwardly from central member 30 to be pivotally connected at 21 to shaft 2 which passes through sprocket 3. Shaft 2 is supported in transmission case 4 which is formed at 5 to expose shaft 2 for pivotally connecting bracket 40 thereto by means of bearing 41. The forward end of bracket 40 is secured to member 30 adjacent inner side channel 10, for which purpose it is provided with flange 42. Bracket 40 extends inwardly and then upwardly to bearing 41, as shown in Fig. 8. The truck frame is made up of four pieces, namely, the central member, having two side channels secured thereto and arranged substantially parallel to each other, both channels extending forwardly from the central member, the outside channel member extending rearwardly from the central member, and a bracket which extends from the central member inwardly to a bearing on the shaft on which the truck pivots.

The front end of the tractor is supported on the truck frames by means of an equalizer spring 12 having its inner ends resting on seats 32, as indicated in Fig. 7, and as shown in detail in the patent to Best, No. 1,715,055, May 28, 1929. Seat 32 is secured to channel 33 (Fig. 3) which is bolted at 34 to central member 30.

The truck frame is adapted to oscillate about the axis of shaft 2. The forward end of the truck frame is resiliently connected by equalizer spring 12 to the main frame of the tractor and to the other truck, the two trucks being similarly constructed.

The truck frame is particularly designed to receive a recoil spring assembly which urges idler 1 forwardly to maintain proper tension in track 6 and to permit idler 1 to recoil from track 6 (Fig. 1) and to permit idler 1 to recoil from track 6, in case the track becomes clogged. For this purpose, central member 30 is formed with recess 35 (Figs. 3 and 6). Recoil springs 50, 51, arranged one within the other and oppositely wound are retained between a head 52 and a washer 53 which is retained by nut 54 on bolt 55. Square head 56 of bolt 55 fits in square aperture 57 in boss 58 on head 52 which prevents bolt 55 from turning. Sleeve 59 is loose on bolt 55 and serves to limit the amount of compression of springs 50, 51, by contact of its ends with bosses 60, 61 on washer 53 and head 52, respectively. As shown in Fig. 3, these springs are extended to the fullest extent permitted by head 52 and washer 53, which are prevented from moving farther apart by bolt head 56 and nut 54. The recoil springs are constantly under compression, the normal amount of compression being determined by the position of nut 54 on bolt 55.

The supporting shaft of front idler 1 is connected to head 52 for movement therewith. For this purpose member 62 has flange 63 by which it is secured to head 52 by suitable fastening bolts (Figs. 2 and 3). Member 62 has forwardly extending arms 64, 65 (Fig. 2) which are provided with aligned apertures 66, 67 (Fig. 4) to receive the shaft of idler wheel 1. Member 62 is a hollow body as indicated in Figs. 3, 4 and 7, and central portion 68 serves as a housing for the inner end of equalizer spring 12 and its seat 32, the spring being admitted through a hooded aperture 69 (Fig. 7). Member 62 is adapted to slide upon side channels 10 and 20. To guide member 62 in this sliding movement, it is provided with guides 70, 71, 72, 73 (Figs. 2 and 7). Each guide has an inwardly extending flange which underlies the outwardly extending web of the side channel. Member 62, together with idler 1 and head 52, is adapted to slide as a unit along the truck frame.

Rear end of bolt 55 has headed sleeve or nut 74 threaded thereon. Sleeve 74 is made of hexagonal stock with the central portion turned at 75 to fit in a bearing (Fig. 5), cap 76 of which is secured by a pair of studs and nuts 77 to base 78 which is integral with housing 79 secured by cap screws 80 (Fig. 4) to central frame member 30. After loosening cap 76, sleeve 74 may be turned to shift bolt 55 axially, thereby adjusting idler 1 to its normal position. Sleeve 74 thus serves as an adjusting nut to position bolt 55.

Housing 79 (Fig. 3) covers the rear end of the recoil spring assembly and head 52 has a portion 81 which extends rearwardly toward housing 79 to cover the forward end of the recoil spring assembly. Extension shield 82 is secured to the forward edge of housing 79 and overlaps housing 81, housing 81 being free to slide in and out of shield 82. Cover 83 for adjusting sleeve 74 is secured by cap screw 84 to cap 76. Cover 83 is provided with hand holds 85, 86 (Fig. 5) for ready removal. In this manner the recoil spring mechanism is entirely enclosed in the truck frame and the housings mounted thereon.

A series of truck rollers 87 are suitably mounted in bearings secured to the under sides of the truck frame, and are protected from dirt by shields 88. Shield 89 (Fig. 1) is secured to the rear end of outside channel member 20 to protect the sprocket, and is formed as a continuation of the recoil spring housings. Shield 89 is apertured for access to the end of shaft 2 and this aperture is covered by plate 90.

Rollers 91, 92 journaled in bearing brackets 93, 94 secured to pads 95, 96 on member 62 and housing 79, respectively, support the upper run of the track 6. The recoil springs are enclosed in a telescopic housing consisting of recess portion 35 of central frame member 30, housing 79, shield 82, and sliding head 52 with housing 81 integral therewith. The end of equalizer spring 12 is enclosed in chamber 68 in member 62. Rollers 87 are protected by shields 88, and sprocket 3 by shield 89. In this manner, substantially the entire track mechanism, with the exception of the track itself, is enclosed and protected from dirt.

I, therefore, claim as my invention:

1. In a vehicle, a track mechanism therefor, comprising an endless track, a frame, means on said frame including an adjustable wheel to support said track, a member associated therewith slidable on said frame, a head secured thereto, a bolt in said head, a nut on said bolt, means to secure said nut to said frame, a spring encompassing said bolt and adapted at one end thereof to press against said head to slide said member on said frame, and means for providing an abutment for the opposite end of said spring.

2. In a vehicle, a track mechanism therefor, comprising an endless track, a frame, means on said frame to support said track, including a wheel adjustable with respect to said frame, a yoke member slidable on said frame to support said wheel, a housing secured to said member, a housing secured to said frame and overlapping said first housing, a pre-compressed spring within said housings for resisting movement of said wheel in one direction, and means including a nut outside said housings to adjust said wheel.

3. In a vehicle, a track mechanism therefor, comprising an endless track, a frame, a wheel, a member slidable on said frame to support said wheel, a head secured to said member having an aperture therein, a bolt disposed in said aperture, a sleeve threaded on one end of said bolt, a bearing for said sleeve secured to said frame and holding said sleeve against movement longitudinally of the frame, a nut and washer on said bolt, a coiled spring interposed between said washer and said head, and a sleeve on said bolt to limit compression of said spring.

4. In a vehicle having a main frame, track mechanism therefor, including an auxiliary frame having forwardly projecting members providing a space therebetween, a yoke member having a rear housing portion and slidably mounted on said auxiliary frame, an idler wheel journaled on said yoke member and positioned in the space between said forwardly projecting members, the yoke member housing portion having a side opening adapted to admit a device for transmitting weight from said main frame to said auxiliary frame and so that said device can cooperate with said auxiliary frame within the yoke member housing portion, a second housing portion secured to the yoke member housing portion, a spring for resisting rearward sliding movement of the yoke member and the wheel relative to the auxiliary frame, one end portion of the spring projecting into said second housing portion, a third housing portion mounted on the auxiliary frame in which the opposite end portion of said spring projects, and means forming a telescopic connection between said second and third housing portions.

5. In a vehicle having a main frame, track mechanism therefor, including an auxiliary frame, a wheel-supporting member having a housing portion and slidably mounted on said auxiliary frame, a wheel journaled on said member, the housing portion having a side opening adapted to admit a device for transmitting weight from said main frame to said auxiliary frame and so that said device can cooperate with said auxiliary frame within the housing portion, a second housing portion secured to the wheel-supporting member housing portion, a spring for resisting rearward sliding movement of the wheel-supporting member and the wheel relative to the auxiliary frame, one end portion of the spring projecting into said second housing portion, a third housing portion mounted on the auxiliary frame in which the opposite end portion of said spring projects, and means forming a telescopic connection between said second and third housing portions to fully protect said spring.

6. In a vehicle having a main frame, track mechanism therefor, including an auxiliary frame, a member slidably mounted on said auxiliary frame adjacent the front thereof and having a wheel journaled thereon, a device for transmitting weight from said main frame to said auxiliary frame, means including a spring extending longitudinally of the auxiliary frame to resist rearward sliding movement of the member and wheel, and telescopic housing means for fully enclosing the spring including the ends thereof, said housing means having a side aperture through which said device projects.

7. In a vehicle, track mechanism therefor, comprising an endless track, a frame having a substantially imperforate but longitudinally recessed upper surface, a wheel slidably supported by said frame, a spring for resisting movement of said wheel in one direction, said spring being partially encompassed by said recessed portion of the frame, and telescopic housing means encompassing the remainder of said spring and covering the ends thereof.

8. In a vehicle, track mechanism therefor, comprising an endless track, a frame, a wheel supported by said frame for bodily movement relative thereto, a spring for resisting movement of said wheel in one direction, and telescopic housing means covering the ends of said spring and cooperating with the frame to fully enclose the spring.

9. In a vehicle having a main frame, track mechanism therefor, including an auxiliary frame, a device for transmitting weight from said main frame to said auxiliary frame, a wheel supported by said auxiliary frame for bodily movement relative thereto and adjacent the front thereof, a spring for resisting rearward sliding movement of said wheel, and telescopic housing means covering the ends of said spring and cooperating with the auxiliary frame to fully enclose the spring, said housing means being provided with a side aperture into which said device projects.

10. In a vehicle, track mechanism therefor, comprising an endless track, a frame, a wheel mounted for bodily movement with respect to said frame and adapted to contact said track, and means for controlling said movement of said wheel, comprising means movable with said wheel, means fixed to said frame, spring means confined between two elements, one of said elements being part of said means movable with said wheel, said elements being movable toward and from each other to vary the compression on said spring means, a member passing through said spring means and said elements having means thereon to prevent movement of one of said elements with respect to said member in one direction and movement of said other element in the opposite direction, and means cooperating with said means fixed to said frame and with said member for effecting adjustment of said member.

11. In a vehicle, track mechanism therefor, comprising an endless track, a frame, a wheel mounted for bodily movement with respect to said frame and adapted to contact said track, and means for controlling said movement of said wheel, comprising means movable with said wheel, means fixed to said frame, spring means confined between two elements mounted on a bolt having a nut threaded thereon, the compression of the spring means being determined by the position of the nut on the bolt, one of said elements being connected to said means movable with said wheel, and a second nut on said bolt and secured against movement axially of said bolt in said means fixed to said frame.

12. In a vehicle, track mechanism therefor, comprising an endless track, a frame, a wheel mounted for bodily movement with respect to said frame and adapted to contact said track, and mechanism mounted substantially completely between the sides of said frame for limiting movement of said wheel beyond a selected point on said frame in a direction to contact said track and to apply a resisting force in opposition to movement of said wheel from said point in the opposite direction, said mechanism being selectively adjustable either to select the location of said point without altering the amount of said resisting force or to predetermine the amount of said resisting force.

13. In a vehicle, track mechanism therefor, comprising an endless track, a frame, a wheel mounted for bodily movement with respect to said frame and adapted to contact said track, and mechanism mounted substantially completely between the sides of said frame for limiting movement of said wheel beyond a selected point on said frame in a direction to contact said track and to apply a resisting force in opposition to movement of said wheel from said point in the opposite direction, said mechanism having adjustable means to select the location of said point without altering the amount of said resisting force, and also having means adjustable independently of said first-mentioned adjustable means to predetermine the amount of said resisting force.

14. In a vehicle, track mechanism therefor, comprising an endless track, a frame, a wheel mounted for bodily movement with respect to said frame and adapted to contact said track, mechanism for limiting movement of said wheel beyond a selected point on said frame in a direction to contact said track and to apply a resisting force in opposition to movement of said wheel from said point in the opposite direction, said mechanism having adjustable means to select the location of said point without altering the amount of said resisting force, and also having means adjustable independently of said first-mentioned adjustable means to predetermine the amount of said resisting force, and housing means for protecting said mechanism and having a portion bodily movable with said wheel, the housing means enclosing said second-mentioned adjustable means, the first-mentioned adjustable means being without said housing means.

15. In a vehicle, track mechanism therefor, comprising an endless track, a frame, a wheel contacting said track and mounted for bodily movement with respect to said frame, an abutment mounted for movement with said wheel, resilient means compressed against said abutment to thrust the wheel toward the track, means including an adjustable member for limiting the movement of said wheel caused by the thrust of said spring, means fixed to said frame, a member mounted in said means fixed to said frame and threadedly connected with said adjustable member to provide for adjustment of said wheel, and a member adjustable independently of said adjustable member and supported by said adjustable member to vary the compression on said spring.

16. In a vehicle, track mechanism therefor, comprising an endless track, a frame, a wheel contacting said track and mounted for bodily movement with respect to said frame, and mechanism for both thrusting the wheel toward said track and for limiting the extent of movement caused by said thrust, comprising a spring, an adjustable abutment for varying compression on said spring, an adjustable member serving to carry said abutment, a threaded adjusting member mounted on said adjustable member, and means for clamping said threaded adjusting member and said adjustable member in a fixed position.

17. In a vehicle, track mechanism therefor, comprising an endless track, a frame, a bodily movable wheel supported by said frame and contacting said track, a spring abutment mounted for movement with said wheel, and mechanism for both thrusting the wheel toward said track and limiting the movement caused by said thrust, comprising an adjustable member engaging said spring abutment, an element adjustable along said adjustable member, a spring compressed between said element and said abutment, a threaded adjusting member mounted on said adjustable member, and means for fixedly clamping said threaded adjusting member and said adjustable member in an adjusted position.

18. In a vehicle, track mechanism therefor, comprising an endless track, a frame, a bodily movable wheel supported by said frame and adapted to contact said track, a spring abutment movable with said wheel, and means for controlling said movement of said wheel, comprising a spring compressed between said abutment and an element adjustable to vary compression on said spring, said spring thrusting the wheel toward said track, means for limiting the extent of movement of said wheel caused by thrust of said spring, including an adjustable member serving both to support said element and to engage said spring abutment, and means for effecting adjustment of said adjustable member without imparting rotative movement to said adjustable member.

19. In a vehicle, track mechanism therefor, comprising an endless track, a frame, a wheel mounted for bodily movement with respect to said frame and adapted to contact said track, and means for controlling said movement of said wheel, comprising means movable with said wheel and having an abutment, a bolt passing through said abutment so that the abutment can move therealong, said bolt having a head adapted to engage said abutment to limit movement thereof in one direction, a threaded member on said bolt, means to fixedly clamp said threaded member to said frame, a spring bearing at one portion thereof against said abutment to resist movement thereof in a direction opposite to that of said first-mentioned direction, and means for providing an abutment for another portion of said spring.

20. In a vehicle, track mechanism therefor, comprising an endless track, a frame, a wheel mounted for bodily movement with respect to said frame and adapted to contact said track, and means for controlling said movement of said wheel, comprising means movable with said wheel and having an abutment, a bolt passing through said abutment so that the abutment can move therealong, said bolt having a head adapted to engage said abutment to limit movement thereof in one direction, a threaded member on said bolt, means to fixedly clamp said threaded member to said frame, a washer adjustably secured on said bolt, and a spring compressed between said washer and said abutment to resist movement of said abutment in a direction opposite to that of said first-mentioned direction.

21. In a vehicle, track mechanism therefor, comprising an endless track, a frame, a wheel mounted for bodily movement with respect to said frame and adapted to contact said track, and means for controlling said movement of said wheel, comprising means movable with said wheel and having an abutment, a bolt passing through said abutment so that the abutment can move therealong, said bolt having a head adapted to engage said abutment to limit movement thereof in one direction, a threaded member on said bolt, means to fixedly clamp said threaded member to said frame, a washer adjustably secured on said bolt, a spring compressed between said washer and said abutment to resist movement of said abutment in a direction opposite to that of said first-mentioned direction, and housing means cooperating with said abutment for fully enclosing the spring including the ends thereof.

22. In a vehicle, track mechanism therefor, comprising an endless track, a frame, a wheel mounted for bodily movement with respect to said frame and adapted to contact said track, and means for controlling said movement of said wheel, comprising means movable with said wheel and having an abutment, a bolt passing through said abutment so that the abutment can move therealong, said bolt having a head adapted to engage said abutment to limit movement thereof in one direction, a threaded member on said bolt, means to fixedly clamp said threaded member to said frame, a washer adjustably secured on said bolt, a spring compressed between said washer and said abutment to resist movement of said abutment in a direction opposite to that of said first-mentioned direction, and a sleeve about said bolt and interposed between said washer and said abutment to limit movement of said abutment in a direction opposite to that of said first-mentioned direction.

23. In a vehicle, track mechanism therefor, comprising an endless track, a frame, a wheel mounted for adjustable movement relative to said frame, means for yieldingly maintaining the wheel in contact with said track, and mechanism for controlling movement of said wheel comprising a member movable with said wheel and urged forwardly of said frame by said yielding means, an adjusted stop cooperating with said member to provide one limit of movement of said wheel, an adjustable stop cooperating with said member and with said adjusted stop for providing another limit of movement of said wheel and for determining the location of one of said limits of movement with respect to the frame, and means relatively movable with respect to said adjustable stop for effecting adjustment thereof.

24. In a vehicle, track mechanism therefor, comprising an endless track, a frame, a wheel mounted for adjustable movement relative to said frame, means for yieldingly maintaining the wheel in contact with said track, and mechanism for controlling movement of said wheel comprising a pair of stops for fixing the limits of movement of said wheel, means for mounting said stops for simultaneous movement together to fix the location of said stops with respect to said frame without changing the limits of movement of said wheel, and housing means for said stops and said yielding means.

25. In a vehicle, track mechanism therefor, comprising a frame, an endless track about said frame, means for carrying the endless track including an idler wheel adjacent the front of said frame and adjustably supported for bodily movement, mechanism supported by said frame for resisting rearward movement of said idler wheel, housing means mounted for movement with said idler wheel to receive one end portion of said mechanism, and housing means on said frame to receive an opposite end portion of said mechanism, said housing means cooperating with said frame to shield the entire mechanism irrespective of bodily movement of said idler wheel.

26. In a vehicle, track mechanism therefor, comprising a frame, an endless track about said frame, means for carrying the endless track including an idler wheel adjacent the front of said frame and adjustably supported for bodily movement, spring means on said frame for resisting rearward movement of said idler wheel, housing means mounted for movement with said idler wheel to receive and shield one end portion of said spring means, housing means fixedly mounted on said frame to receive and shield the opposite end portion of said spring means, means within said housing means and also shielded thereby to hold said spring means under compression, and means providing a telescopic connection between said housing means to shield the central portion of said spring means and said compression holding means irrespective of bodily movement of said front idler wheel and said housing means mounted for movement therewith.

27. In a vehicle, track mechanism therefor, comprising a frame, an endless track about said frame, means for carrying the endless track including an idler wheel adjacent the front of said frame and adjustably supported for bodily movement, spring means on said frame for resisting rearward movement of said idler wheel, housing means mounted for movement with said idler wheel to receive and shield one end portion of said spring means, housing means fixedly mounted on said frame to receive and shield the opposite end portion of said spring means, an adjustable bolt having one end portion slidably connected to said first-mentioned housing means, the opposite end portion of said bolt extending outside said fixedly mounted housing means to provide means whereby adjustment of said bolt can be effected, means for fixedly clamping said opposite end portion of said bolt, and means providing a telescopic connection between said housing means to shield the central portion of said spring means and said bolt irrespective of bodily movement of said front idler wheel and said housing means mounted for movement therewith.

28. In a vehicle, track mechanism therefor, comprising a frame, an endless track about said frame, means for carrying the endless track including an idler wheel adjacent the front of said frame and adjustably supported for bodily movement, recoil mechanism including spring means for resisting rearward movement of said idler wheel, an abutment against which one end of said spring means bears, a second abutment mounted for bodily movement with said front idler wheel and against which the opposite end of said spring means bears, shield means between said second abutment and said idler wheel to cover said frame and prevent material from lodging at the rear of said idler wheel, and housing means cooperating with said frame to shield the entire recoil mechanism including the ends of said spring means.

29. In a vehicle, track mechanism therefor, comprising a frame, an endless track about said frame, means including an idler wheel movably mounted upon and adjacent the front of said frame for carrying the track, spring means extending longitudinally along said frame for resisting rearward movement of said idler wheel, and telescopic housing means cooperating with said frame to fully enclose and protect said spring means including the ends thereof, said housing means extending to the axis of rotation of said idler wheel to protect the portion of said frame between said spring means and said axis.

30. In a vehicle, track mechanism therefor, comprising a frame having a forked front end, the prongs of which are formed by substantially parallel members, an idler wheel positioned between said prongs, and means for supporting said idler wheel for slidable movement along said frame and for protecting a portion of the top of said frame, said means comprising a forked housing having arms extending forwardly over said prongs.

31. In a vehicle having a main frame, track mechanism therefor, including an auxiliary frame, an idler wheel, and means for supporting said idler wheel for movement relative to said auxiliary frame, comprising a housing having an aperture adapted to admit a device for transmitting weight from said main frame to said auxiliary frame and so that said device can cooperate with said auxiliary frame within the housing.

32. In a vehicle, track mechanism therefor, comprising a frame, an endless track about said frame, a plurality of wheels engaging said track, one of said wheels being an idler wheel positioned at one turn of said track and another of said wheels being positioned at another turn of said track, said idler wheel being mounted for bodily movement relative to said frame, a recoil device on said frame to yieldingly maintain the idler wheel in engagement with the track, and means to protect from dirt all of said track mechanism with the exception of the track, comprising housing means fully enclosing said recoil device and extending substantially the length of said track mechanism from the axis of rotation of said idler wheel to the axis of rotation of said another wheel, a portion of said housing means being mounted for movement with said movable idler wheel and another portion of said housing means being fixed relative to said frame.

33. In a vehicle having a main frame, track mechanism therefor, comprising an auxiliary frame, an endless track about said auxiliary frame, a plurality of wheels engaging said track, one of said wheels being an idler wheel and another of said wheels being a power-driven wheel to propel the vehicle along the track, said idler wheel being mounted for bodily movement relative to said auxiliary frame, a recoil device on said auxiliary frame to yieldingly maintain the idler wheel in engagement with the track, and means to protect from dirt all of said track mechanism with the exception of the track, comprising housing means fully enclosing said recoil device and extending substantially the length of said track mechanism from the axis of rotation of said idler wheel to the axis of rotation of said power-driven wheel, a portion of said housing means being mounted for movement with said movable idler wheel and another portion of said housing means being fixed relative to said auxiliary frame, the movable portion of said housing means having an opening adapted to admit a device for transmitting weight from said main frame to said auxiliary frame and so that said device can cooperate with said auxiliary frame within the movable portion of said housing means.

34. In a vehicle having a main frame, track mechanism therefor, comprising a truck frame, means for movably connecting said truck frame to said main frame, an endless track about said truck frame, rollers on the underside of said truck frame for supporting the truck frame on the track, a bodily movable idler wheel adjacent the front of said truck frame and engaging the track, a power-driven wheel adjacent the rear of said truck frame and engaging the track, recoil mechanism on said truck frame for yieldingly maintaining the idler wheel in engagement with the track, a housing portion movable with said idler wheel for protecting the front part of the track mechanism, a stationary housing portion cooperating with said movable housing portion for protecting the rear part of the track mechanism, and track-carrying rollers mounted on said housing portions and substantially equispaced between the axes of said front idler wheel and the power-driven wheel for supporting the upper run of said track, one of said track-carrying rollers being mounted on said movable housing means.

35. In a track-type tractor, a main tractor body, a pair of truck frames, load-supporting devices for transmitting the weight of said body to each of said truck frames at positions adjacent the front and rear of each of said truck frames, an endless track about each truck frame, wheels on each truck frame, including an idler wheel bodily movable for engaging the endless track and journaled for rotation about an axis in front of the front load-supporting device, recoil mechanism on each truck frame and positioned at the rear of the front load-supporting device for yieldingly maintaining the idler wheel in engagement with the track, and housings extending along each truck frame for protecting the journals of all said wheels, the load-supporting devices and the recoil mechanism.

36. In a track-type tractor, a main tractor body, a pair of truck frames, load-supporting devices for transmitting the weight of said body to each of said truck frames at positions adjacent the front and rear of each of said truck frames, an endless track about each truck frame, wheels on each truck frame, including an idler wheel bodily movable for engaging the endless track and journaled for rotation about an axis in front of the front load-supporting device, recoil mechanism on each truck frame and positioned at the rear of the front load-supporting device for yieldingly maintaining the idler wheel in engagement with the track, housing means movably mounted with each idler wheel and extending substantially along the front half of each truck frame for protecting the journal of said idler wheel, the front load-supporting device and a front portion of the recoil mechanism, and stationary housing means cooperating with said movable housing means on each truck frame and extending substantially along the rear half of the truck frame, for protecting the rear load-supporting device and the rear portion of said recoil mechanism.

37. In a track-type tractor, a main tractor body, a pair of truck frames, load-supporting devices for transmitting the weight of said body to each of said truck frames at positions adjacent the front and rear of each of said truck frames, an endless track about each truck frame, wheels on each truck frame, including an idler wheel bodily movable for engaging the endless track and journaled for rotation about an axis in front of the front load-supporting device, recoil mechanism on each truck frame and positioned at the rear of the front load-supporting device for yieldingly maintaining the idler wheel in engagement with the track, housing means movably mounted with each idler wheel and extending substantially along the front half of each truck frame for protecting the journal of said idler wheel, the front load-supporting device and a front portion of the recoil mechanism, and stationary housing means cooperating with said movable housing means on each truck frame and extending substantially along the rear half of said truck frame, for protecting the rear load-supporting device and the rear portion of said recoil mechanism, said housing means on each truck frame having a telescopic connection.

38. In a track-type tractor, a main tractor body, a truck frame pivotally connected to said body, a final drive wheel journaled on said truck frame adjacent the rear thereof, an idler wheel mounted for bodily movement on said truck frame adjacent the front thereof, an endless track encompassing said wheels, recoil mechanism on said truck frame for yieldingly maintaining the front idler wheel in contact with the track, rollers on the under part of said truck frame to support the truck frame on the track, a load-supporting device between said main body and the truck frame at a position at the rear of said front idler wheel and in front of said recoil mechanism, and housing means for protecting all of said foregoing mentioned track mechanism, said housing means comprising portions extending from the axis of rotation of said front idler wheel to a position adjacent the rim of said final drive wheel for protecting the journal of said front idler wheel, the load-supporting device and the recoil mechanism, another portion extending rearwardly from said first-mentioned portions to protect the journal of said final drive wheel and to deflect dirt, and a final portion extending from the underside of said truck frame and cooperating with the under run of said track for protecting said rollers on the under part of said truck frame and for preventing dirt from gathering on the under run of said track.

39. In a vehicle, track mechanism therefor comprising an endless track, a frame, a wheel mounted for bodily movement with respect to said frame and adapted to contact said track; and mechanism for limiting movement of said wheel beyond a selected point on said frame in a direction to contact said track including resilient means to apply a resisting force in opposition to movement of said wheel from said point in the opposite direction, adjustable means for maintaining said resilient means under an adjusted predetermined minimum compression, an adjustable member engaging with means movable with said wheel, means fixed to said frame, and adjustable means cooperating with said adjustable member and with said means fixed to said frame for selecting the location of said point without altering the adjustment of said resilient means.

40. In a vehicle, track mechanism therefor comprising an endless track, a frame, a wheel mounted for bodily movement with respect to said frame and adapted to contact said track; and mechanism for limiting movement of said wheel beyond a selected point on said frame in a direction to contact said track including resilient means to apply a resisting force in opposition to movement of said wheel from said point in the opposite direction, adjustable means for maintaining said resilient means under an adjusted predetermined minimum compression, an adjustable member engaging with means movable with said wheel, means fixed to said frame, and adjustable means cooperating with said adjustable member and with said means fixed to said frame for selecting the location of said point without altering the adjustment of said resilient means, said latter adjustable means including a member having threaded engagement with said adjustable member and non-threaded rotative engagement in said means fixed to said frame.

41. In a vehicle, track mechanism therefor comprising an endless track, a frame, a wheel mounted for bodily movement with respect to said frame and adapted to contact said track; and mechanism for limiting movement of said wheel beyond a selected point on said frame in a direction to contact said track including adjusted resilient means to apply a resisting force in opposition to movement of said wheel from said point in the opposite direction, bracket means fixed to said frame, a threaded adjustable member engaging with means movable with said wheel, and an adjusting member having non-threaded engagement in said bracket means and having threaded engagement with said threaded adjustable member to selectively change the location of said point without altering the adjustment of said resilient means.

42. In a vehicle, track mechanism therefor comprising an endless track, a frame, a wheel mounted for bodily movement with respect to said frame and adapted to contact said track; and mechanism for limiting movement of said wheel beyond a selected point on said frame in a direction to contact said track including adjusted resilient means to apply a resisting force in opposition to movement of said wheel from said point in the opposite direction, bracket means fixed to said frame, a threaded adjustable member engaging with means movable with said wheel, an adjusting member having non-threaded engagement in said bracket means and having threaded engagement with said threaded adjustable member to selectively change the location of said point without altering the adjustment of said resilient means, and stop means on said adjusting member engageable with said bracket means.

43. In a vehicle, a track mechanism therefor, comprising an endless track, a frame, means on said frame to support said track, including a wheel adjustable with respect to said frame, a housing associated with said wheel, a housing telescoping said first housing secured to said frame, and a spring within said housings between said housings and said frame and adapted to resist movement of said wheel in one direction, said housings cooperating with the frame to shield the spring.

HARMON S. EBERHARD.